United States Patent
Parulkar et al.

(10) Patent No.: US 11,171,843 B2
(45) Date of Patent: Nov. 9, 2021

(54) MULTI-CARRIER ACCESS TO PROVIDER SUBSTRATE EXTENSIONS

(71) Applicant: Amazon Technologies, Inc., Seattle, WA (US)

(72) Inventors: Ishwardutt Parulkar, San Francisco, CA (US); Georgios Elissaios, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 16/699,347

(22) Filed: Nov. 29, 2019

(65) Prior Publication Data

US 2021/0168052 A1   Jun. 3, 2021

(51) Int. Cl.
*H04L 12/24* (2006.01)
*H04L 12/66* (2006.01)
*H04L 12/715* (2013.01)
*H04L 29/08* (2006.01)

(52) U.S. Cl.
CPC .......... *H04L 41/5041* (2013.01); *H04L 12/66* (2013.01); *H04L 45/64* (2013.01); *H04L 67/10* (2013.01)

(58) Field of Classification Search
CPC ..... H04L 41/5041; H04L 67/10; H04L 12/66; H04L 45/64
See application file for complete search history.

(56) References Cited

U.S. PATENT DOCUMENTS

| | | | | |
|---|---|---|---|---|
| 10,382,266 | B1 * | 8/2019 | Balakrishnan | H04L 67/10 |
| 10,708,125 | B1 * | 7/2020 | Chen | H04L 41/08 |
| 10,848,423 | B1 * | 11/2020 | Chen | H04L 41/0893 |
| 2011/0075674 | A1 | 3/2011 | Li et al. | |
| 2016/0308762 | A1 * | 10/2016 | Teng | H04L 41/5064 |
| 2016/0337175 | A1 * | 11/2016 | Rao | H04L 41/12 |
| 2017/0019428 | A1 * | 1/2017 | Cohn | H04L 65/1036 |

(Continued)

FOREIGN PATENT DOCUMENTS

WO   2015/179508 A1   11/2015

OTHER PUBLICATIONS

AT&T, "AT&T's Network and Microsoft's Cloud Deliver New Customer Offerings", available online at <https://about.att.com/story/2019/microsoft.html>, Jul. 17, 2019, 3 pages.

(Continued)

*Primary Examiner* — Ramy M Osman
(74) *Attorney, Agent, or Firm* — Nicholson De Vos Webster & Elliott, LLP

(57) ABSTRACT

Techniques for dynamic resource movement in heterogeneous computing environments including provider substrate extensions are described. A dynamic resource movement service of a provider network monitor conditions of heterogeneous computing environments, including provider substrate extensions of the cloud provider network, to evaluate customer-provided movement policy conditions governing when to move customer application resources from these environments, where to move the resource to, and/or how to move the customer application resources. The customer-provided movement policy conditions may be based on a variety of factors, such as a latency between end-users of the customer application and the application itself.

18 Claims, 15 Drawing Sheets

(56) References Cited

U.S. PATENT DOCUMENTS

2019/0230191 A1    7/2019  Bernat et al.
2021/0168052 A1*   6/2021  Parulkar ............... H04L 67/289

OTHER PUBLICATIONS

Microsoft, "AT&T Integrating 5G with Microsoft Cloud to Enable Next-Generation Solutions on the Edge", available online at <https://news.microsoft.com/2019/11/26/att-integrating-5g-with-microsoft-cloud-to-enable-next-generation-solutions-on-the-edge/>, Microsoft News Center, Nov. 26, 2019, 6 pages.
Burakowski et al., "Traffic Management for Cloud Federation", Autonomous Control for a Reliable Internet of Services, LNCS 10768, 2018, pp. 269-312.
International Search Report and Written Opinion, PCT App. No. PCT/US2020/059181, dated Feb. 16, 2021, 13 pages.

* cited by examiner

MULTI-CARRIER ACCESS TO PROVIDER SUBSTRATE EXTENSIONS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the following drawings.

DETAILED DESCRIPTION

Figure 1:
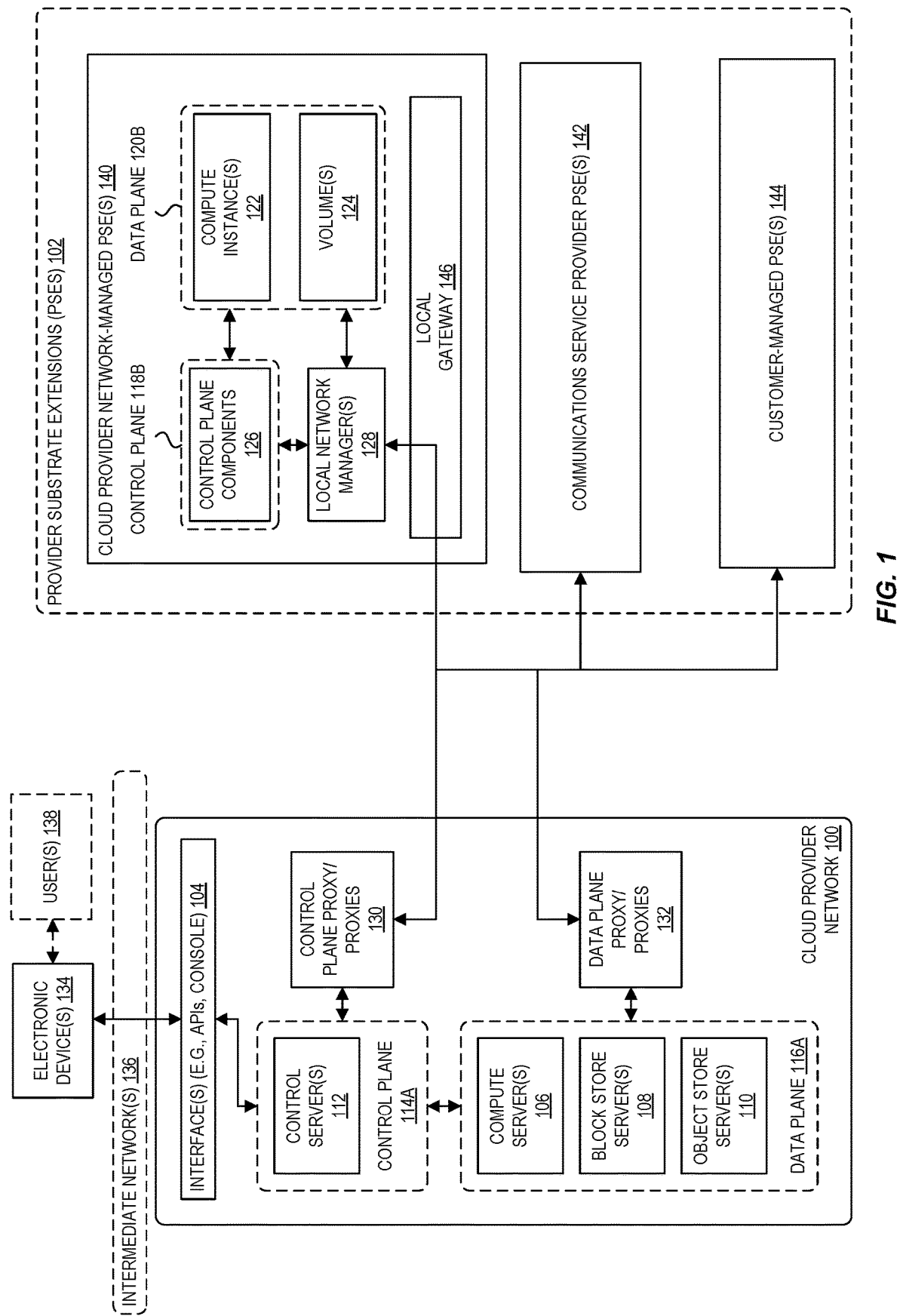
FIG. 1 illustrates an exemplary system including a cloud provider network and further including various provider substrate extensions according to some embodiments.

The present disclosure relates to methods, apparatus, systems, and non-transitory computer-readable storage media for implementing multi-carrier access to provider substrate extensions. A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, segments of a cloud provider network—referred to herein as a provider substrate extension ("PSE")—can be provisioned within a network that is independent from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, at a separate cloud provider-managed facility, at a communications service provider facility, or other facility including servers wherein such server(s) communicate over a network (e.g., a publicly-accessible network such as the Internet) with a nearby availability zone or region of the cloud provider network. Customers may access a provider substrate extension via the cloud provider substrate or another network, and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a remote/distinct control plane of the cloud provider network.

In some embodiments, another example of a provider substrate extension is a network deployed at a communications service provider. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, video conferencing, real-time Internet-based communications, virtual reality, real-time rendering, industrial automation, collaborative platforms, autonomous vehicles, etc.

As used herein, the computing resources of the cloud provider network installed within a communications service provider network are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. A provider substrate extension deployed in a communication service provider network may also be referred to as a "wavelength zone."

FIG. 1 illustrates an exemplary system including provider network substrate extensions at which computing resources can be deployed by customers of a provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object storage servers 110 include one or more servers on which data is stored as objects within resources referred to as buckets, and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 102 ("PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane extension 120B of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and a key value data store that indicates where volume replicas are located. However, generally the control plane 118B functionality for a provider substrate extension will remain in the cloud provider network 100 in order to allow customers to use as much resource capacity of the provider substrate extension as possible.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager. In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, the PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
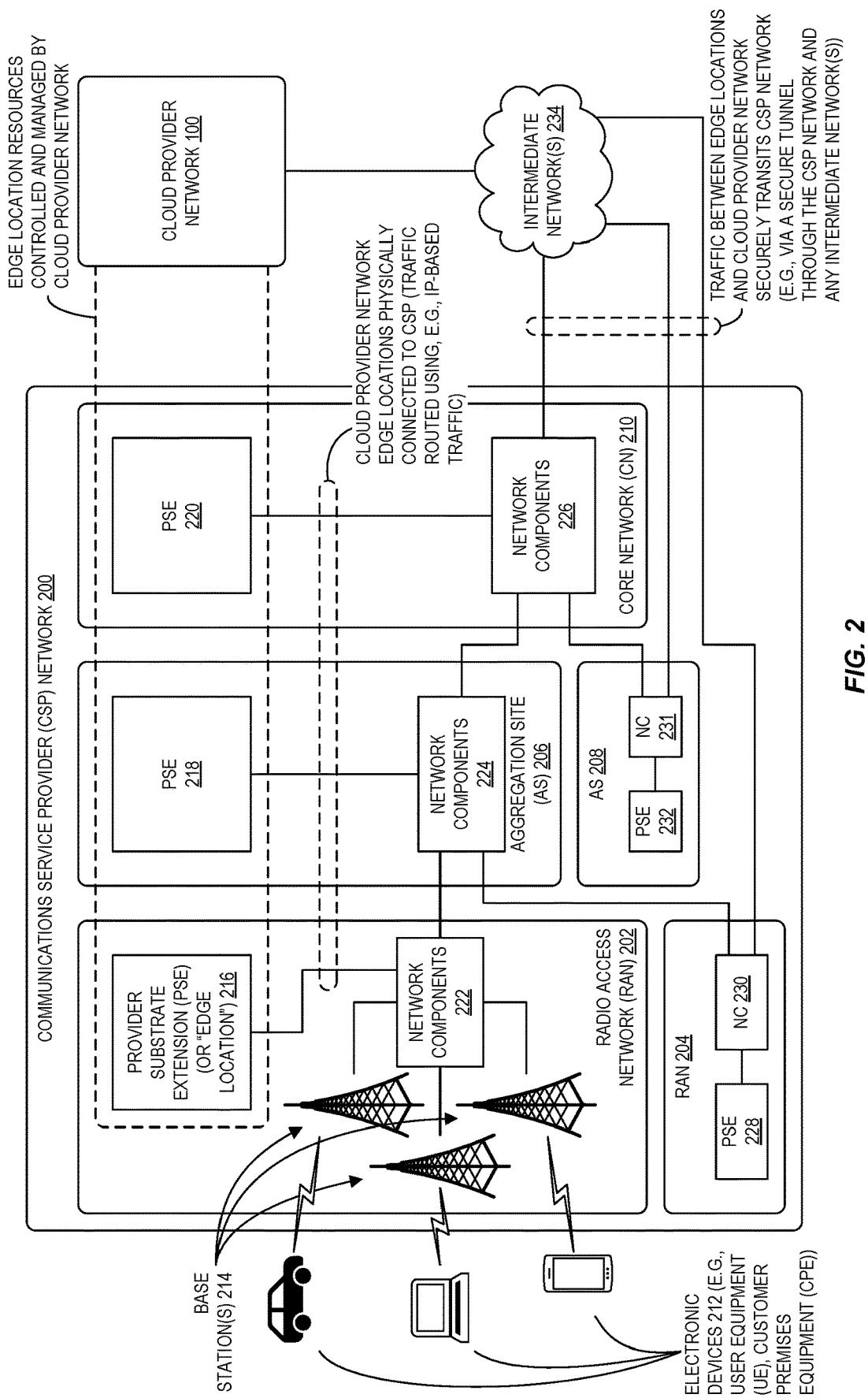
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more CSP sites, which may be data centers, SAP sites or SAP edge sites, LG Extended sites, etc). For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Provider substrate extensions 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—a provider substrate extension is from the cloud provider network 100 (or closer to electronic devices 212), the lower the network latency is between computing resources within the provider substrate extension and the electronic devices 212. However, physical site constraints often limit the amount of provider substrate extension location computing capacity that can be installed at various points within the CSP or determine whether computing capacity can be installed at various points at all. For example, a provider substrate extension sited within the core network 210 can typically have a much larger footprint (in terms of physical space, power requirements, cooling requirements, etc.) than a provider substrate extension sited within the RAN 202, 204.

The installation or siting of provider substrate extensions within a CSP network can vary subject to the particular network topology or architecture of the CSP network. As indicated in FIG. 2, provider substrate extensions can generally be connected anywhere the CSP network can break out packet-based traffic (e.g., IP based traffic). Additionally, communications between a given provider substrate extension and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from a provider substrate extension 216 integrated with the RAN 202, the network components 224 facilitate the routing of data traffic to and from an provider substrate extension 218 integrated with the AS 206, and the network components 226 facilitate the routing of data traffic to and from a provider substrate extension 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 228 and the cloud provider network 100 can be broken out of the CSP network 200 without routing through the core network 210. For example, network components 230 of a RAN 204 can be configured to route traffic between a provider substrate extension 216 of the RAN 204 and the cloud provider network 100 without traversing an aggregation site or core network 210. As another example, network components 231 of an aggregation site 208 can be configured to route traffic between a provider substrate extension 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
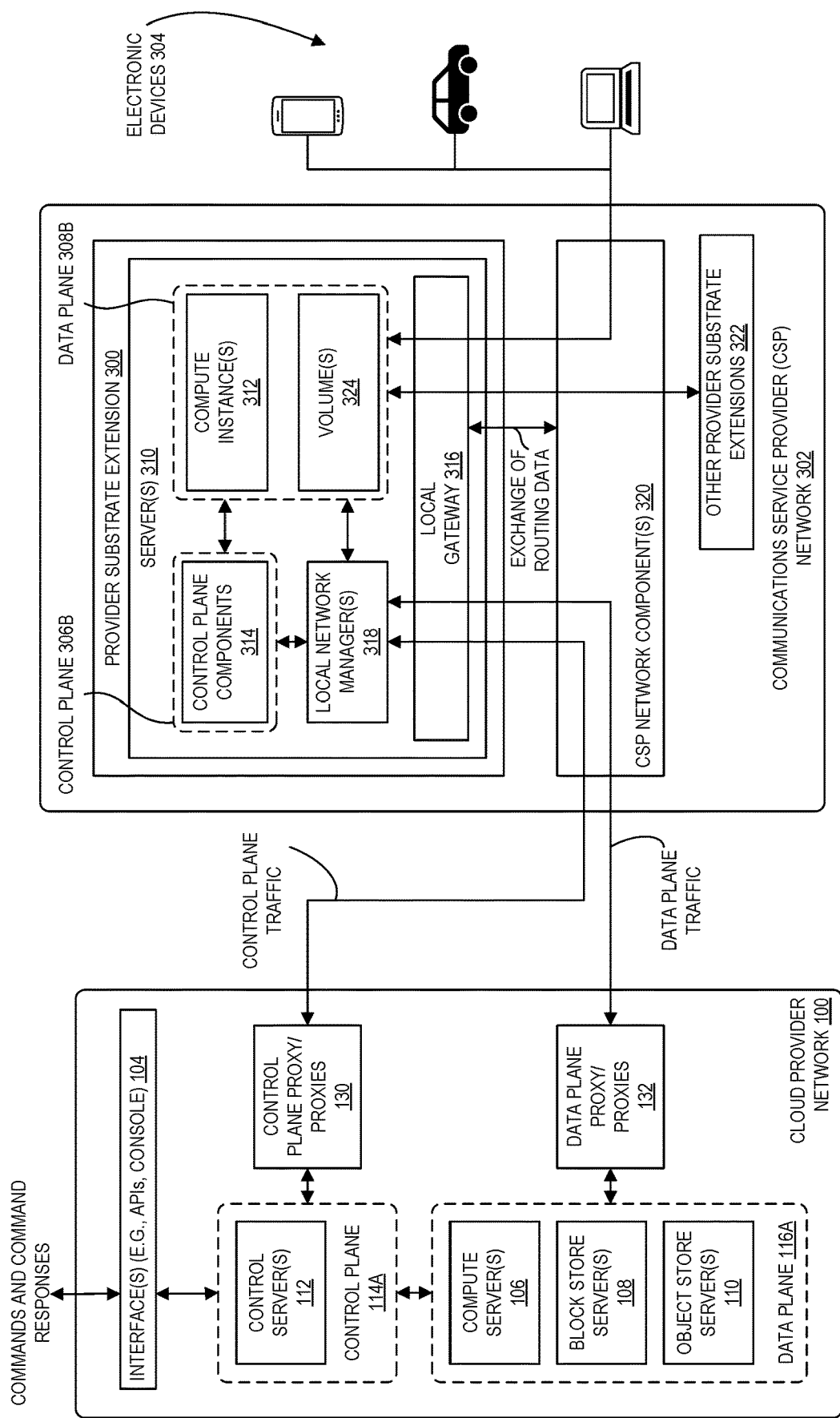
FIG. 3 illustrates in greater detail exemplary components of and connectivity between a provider substrate extension and a cloud provider network according to some embodiments.

FIG. 3 illustrates in greater detail exemplary components of and connectivity between a provider substrate extension associated with a communications service provider and a cloud provider network according to some embodiments. A provider substrate extension 300 provides resources and services of the cloud provider network within a CSP network 302 thereby extending functionality of the cloud provider network 100 to be closer to end user devices 304 connected to the CSP network.

The provider substrate extension 300 similarly includes a logical separation between a control plane 306B and a data plane 308B, respectively extending the control plane 114A and data plane 116A of the cloud provider network 100. The provider substrate extension 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 310 can be provisioned by the cloud provider for deployment within the CSP network 302.

The servers 310 within a provider substrate extension 300 may, in some implementations, host certain local control plane components 314, for example, components that enable the provider substrate extension 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for a provider substrate extension 300 will remain in the cloud provider network 100 in order to allow customers to use as much resource capacity of the provider substrate extension as possible.

As illustrated, the provider substrate extension servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the provider substrate extension 300. The compute instances 312 and any volumes 324 collectively make up a data plane extension 308B of the provider network data plane 116A within the provider substrate extension 300.

A local gateway 316 can be implemented to provide network connectivity between the provider substrate extension 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the provider substrate extension 300 and outbound traffic leaving the provider substrate extension 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of a provider substrate extension 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 200 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the provider substrate extension 300 can have a number of different destinations. For example, traffic addressed to a destination in the data plane 116A of the cloud provider network 100 can be routed via the data plane connection between the provider substrate extension 300 and the cloud provider network 100. The local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 312 addressed to another compute instance hosted in another provider substrate extension 322, the local network manager 318 can encapsulate the packet with a destination as the IP address assigned to the other provider substrate extension 322, thereby allowing the CSP network components 320 to handle the routing of the packet. Alternatively, if the CSP network components 320 do not support inter-edge location traffic, the local network manager 318 can address the packet to a relay in the cloud provider network 200 that can send the packet to the other provider substrate extension 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312. Otherwise, the local network manager 318 can send the packet to an Internet Gateway in the cloud provider network 100 that can provide Internet connectivity for the compute instance 312. For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
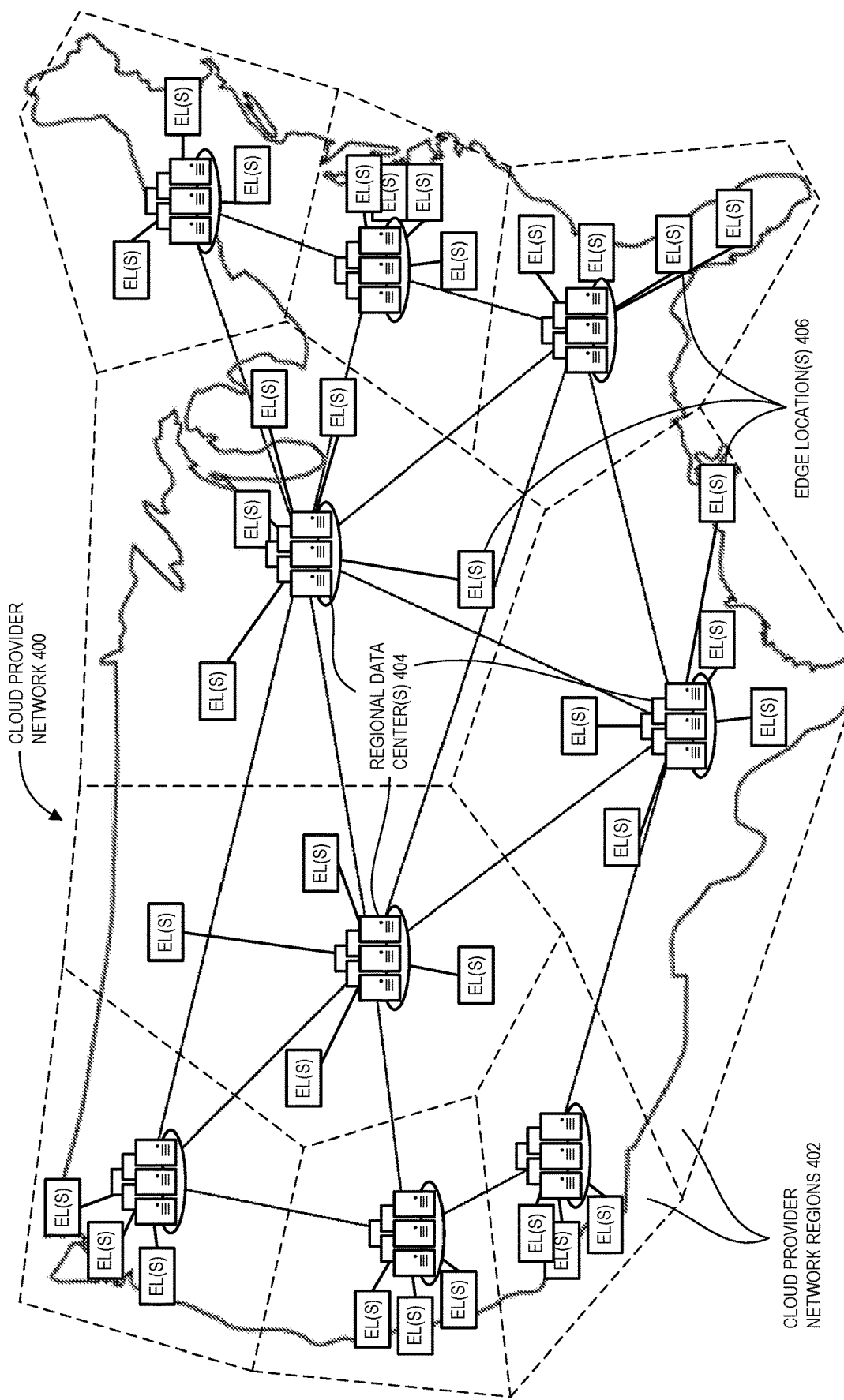
FIG. 4 illustrates an exemplary cloud provider network including provider substrate extensions (or "edge locations") according to some embodiments.

FIG. 4 illustrates an exemplary cloud provider network including provider substrate extension locations (or edge locations) according to some embodiments. As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as far zones (due to being far from other availability zones) or near zones (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

As indicated herein, a cloud provider network can be formed as a number of regions, where a region may be a geographical area in which the cloud provider clusters data centers. Each region can include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location to an AZ or region of the cloud provider network can be based on a number of factors. One such parenting factor is data sovereignty. For example, to keep data originating from a CSP network in one country within that country, the edge locations deployed within that CSP network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

Figure 5:
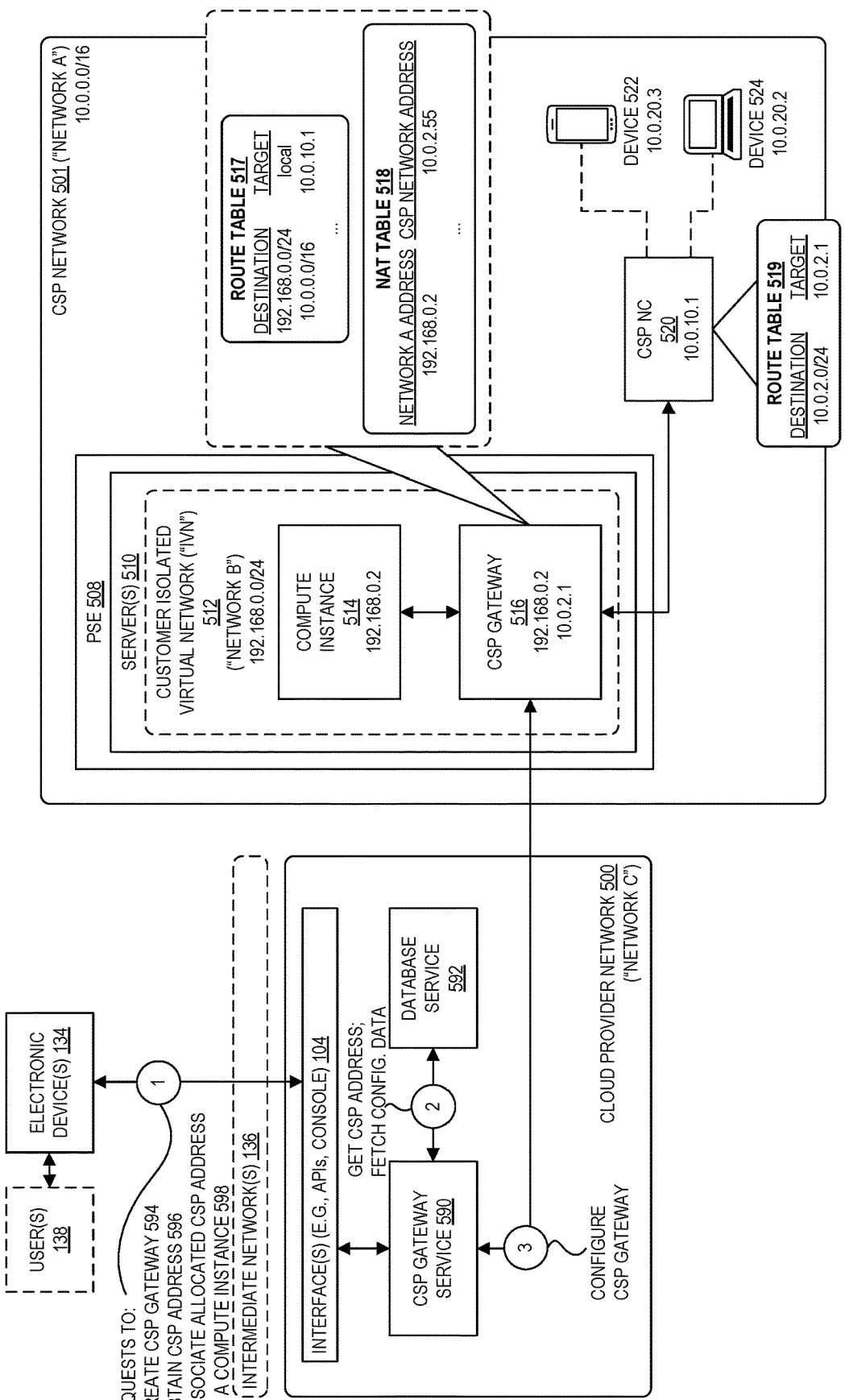
FIG. 5 is a diagram illustrating an environment in which users establish connectivity between compute instances and a communications service provider network according to some embodiments.

FIG. 5 is a diagram illustrating an environment in which users establish connectivity between compute instances and a communications service provider network according to some embodiments. Because edge locations may be connected to multiple CSPs or a given CSP may have multiple networks or network slices (e.g., a 4G network and a 5G network), and each CSP or CSP network may have a different configuration, the cloud provider network offers a new type of gateway that abstracts away the underlying configuration details of a particular CSP network from the customer yet allows the customer to easily establish connectivity to the available CSP network(s). The CSP gateway may be implemented as a new gateway type for customer isolated virtual networks ("IVNs") to establish connectivity to CSP networks. The CSP gateway may be implemented alongside other types of gateways such as an internet gateway (e.g., to facilitate routing from compute instances of the IVN to the internet) and a VPN gateway (e.g., to facilitate routing between the IVN and another customer network such as an on-premise network).

As illustrated, a customer (e.g., a user 138) has launched a compute instance 514 hosted by a server 510 of a PSE 508 (or edge location) that extends a cloud provider network 500 within a CSP network 501, also referred to as "Network A." The compute instance 514 is connected to an isolated virtual network ("IVN") 512, referred to here as "Network B" and which may be implemented as an overlay network on the substrate of the cloud provider network 500, referred to here as "Network C." For example, the IVN 512 may have use a private block of IP addresses—e.g., 192.168.0.0/24—that can be used to address devices on the IVN 512 such as the compute instance 514, while a local network manager (not shown) performs the encapsulation and decapsulation of packets respectively sent from and to devices on the IVN 512 within packets addressed to devices (e.g., servers 510) on the cloud provider network 500 substrate. Here, the compute instance 514 has been assigned the IP address 192.168.0.2.

As part of deploying the PSE 508 within the CSP network 501, the CSP can allocate some pool of network addresses from the CSP network 501 for use by the PSE 508. In this example, the CSP network address range 10.0.2.0/24 is assigned to the PSE 508 (some larger range may be assigned to all PSEs deployed within the CSP network and distributed out to the various PSEs by the cloud provider network). The PSE 508 can advertise those addresses to the CSP network 501. For example, a local gateway (not shown) can advertise the allocated block of addresses via BGP to the CSP network 501.

Given the above environment, the numbered circles "1" through "3" illustrate an exemplary process that includes a user requesting a gateway to provide connectivity between the compute instance 514 and the CSP network 501.

At circle "1," the user 138 generates a request 594 to create a CSP gateway using an electronic device 134. As indicated above, communications between electronic device(s) 134 and the provider network 100, such as a request to create a CSP gateway, can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like. The request 594 can include an identifier of the IVN in which to create the CSP gateway such as IVN 512. Upon receipt of the request, a CSP gateway service 590 can create a CSP gateway 516 as part of the specified IVN, assign an IP address within the IVN 512 range to the CSP gateway 516 (e.g., 192.168.0.1), and return an identifier, such as the IP address, to the electronic device 134.

Note that the customer IVN 512 may include a router and associated route table. The route table can include a default entry for IP addresses within the private range of the customer IVN (e.g., route packets destined for 192.168.0.0/24 locally), and the user 138 can add another entry for packets that do not satisfy the default route to the CSP gateway 516 (e.g., route packets destined for 0.0.0.0/0 to the CSP gateway).

Also as indicated at circle "1," the user 138 generates a request 596 to obtain a CSP network address from the pool of CSP network addresses. The request 596 can include an identifier of the particular CSP network address pool from which to allocate an address. For example, the request may be for an IP address for Carrier A's 4G network, Carrier A's 5G network, Carrier B's network, etc. Using the identifier, the CSP gateway service 590 allocates one of the available addresses from the associated pool to the customer and records that allocation. The CSP gateway service 590 can track the status of addresses in the pool (e.g., whether or not allocated) in a database provided by a database service 592 or other data store, as indicated at circle "2." The CSP gateway service 590 can return the allocated IP address (or an identifier of such) to the electronic device 134. In this example, the CSP gateway service 590 allocates the address 10.0.2.55 from the 10.0.2.0/24 pool.

Also as indicated at circle "1," the user 138 generates a request 598 to associate an allocated IP address with a particular compute instance. The request 598 can include an instance identifier and the IP address or IP address identifier. In this example, the request identifies the compute instance 514 and the allocated 10.0.2.55 address. Using the identifier, the CSP gateway service 590 configures the CSP gateway 516 to establish connectivity between the compute instance 514 and the CSP network 501. Such connectivity can allow devices such as device 522 and device 524 to connect to the compute instance 514 through the CSP network 501 thereby taking advantage of the low latency provided by the deployment of the PSE 508 within the CSP network 501.

Because various CSP networks or network slices can have a variety of network configuration parameters, the CSP gateway service 590 obtains configuration data for the particular CSP network from a database provided by a database service 592 or other data store, as indicated at circle "2." The database can include, for each CSP network, information such as the IP address of the network component through which traffic entering and leaving a given PSE is routed, whether the CSP network has a particular vlan tag, whether the CSP network is reached through a particular interface of the PSE (e.g., a first network adapter or a second network adapter), etc. In this example, the configuration data indicates that the PSE 508 is connected to a CSP network component 520 (e.g., a gateway or router) having an IP address 10.0.10.1.

At circle "3" in FIG. 5, the CSP gateway service 590 sends one or more commands to configure the CSP gateway 516. Such commands may be sent as control plane traffic via a proxy (e.g., proxy 130). Here, connectivity is established by configuring a route table 517 and a network address translation (NAT) table 518 of the CSP gateway 516. In particular, the CSP gateway service 590 creates or updates the route table 517 with a route for packets to the 10.0.0.0/16 range to the CSP network component 520 at 10.0.10.1, thus permitting messages sent from the compute instance 514 to, for example, device 522 or device 524, to be routed via the CSP gateway 516 and CSP network 501. The route table 517 further includes a local route to indicate packets addressed to destinations within the range of the IVN 512 are routed within the IVN 512. Additionally, the CSP gateway service 590 creates or updates the NAT table 518 to associate the allocated IP address (10.0.2.55) with the compute instance 514 (192.168.0.2), thus permitting messages sent from the CSP network (e.g., from device 522 or device 524) to the 10.0.2.55 address to reach the compute instance 514. Note that the CSP network component 520 includes an entry in its route table 519 to route messages destined for the 10.0.2.0/24 range to the CSP gateway (10.0.2.1). Such an entry may be based off an exchange of routing information (e.g., via BGP).

Although IP version 4 addressing is illustrated in FIG. 5, IP version 6 addressing may also be used. Additionally, in some embodiments, the CSP gateway bridges between IP version 4 and IP version 6. For example, the IVN of a compute instance may use IPv4 addressing while a CSP network may use IPv6 addressing or vice versa.

Note that the above description assumed the customer compute instance 514 was already running before establishing connectivity to the CSP network 501 via the CSP gateway 516. In other embodiments, the customer may request the launch of a compute instance (e.g., via a hardware virtualization service) with one or more configuration parameters (e.g., as described with reference to circle "1") to automatically connect the launched instance to a specified CSP network via a CSP gateway. Additionally, one or more of the requests 594, 596, and/or 598 may be combined. For example, a single request may be used to obtain and assign an address for a particular CSP network address to an identified compute instance.

In some embodiments, the customer can configure the CSP gateway to permit or deny certain kinds of traffic. For example, the customer might specify that the CSP gateway is to only permit outbound traffic from a compute instance to the CSP network (e.g., the compute instance 514 connects to the device 522). As another example, the customer might specify that the CSP gateway is to only permit inbound traffic (e.g., the device 522 connects to the compute instance 514).

In the case where a separate CSP gateway is implemented for each customer IVN, the CSP gateway may have multiple network addresses—e.g., one on the customer IVN and one or more for each of the connected CSP networks. Because the number of addresses on the customer IVN and CSP network(s) are finite, the CSP gateways for multiple (or all) customer IVNs hosted by a PSE may be implemented by a common component. One such approach is illustrated in FIG. 6.

Figure 6:
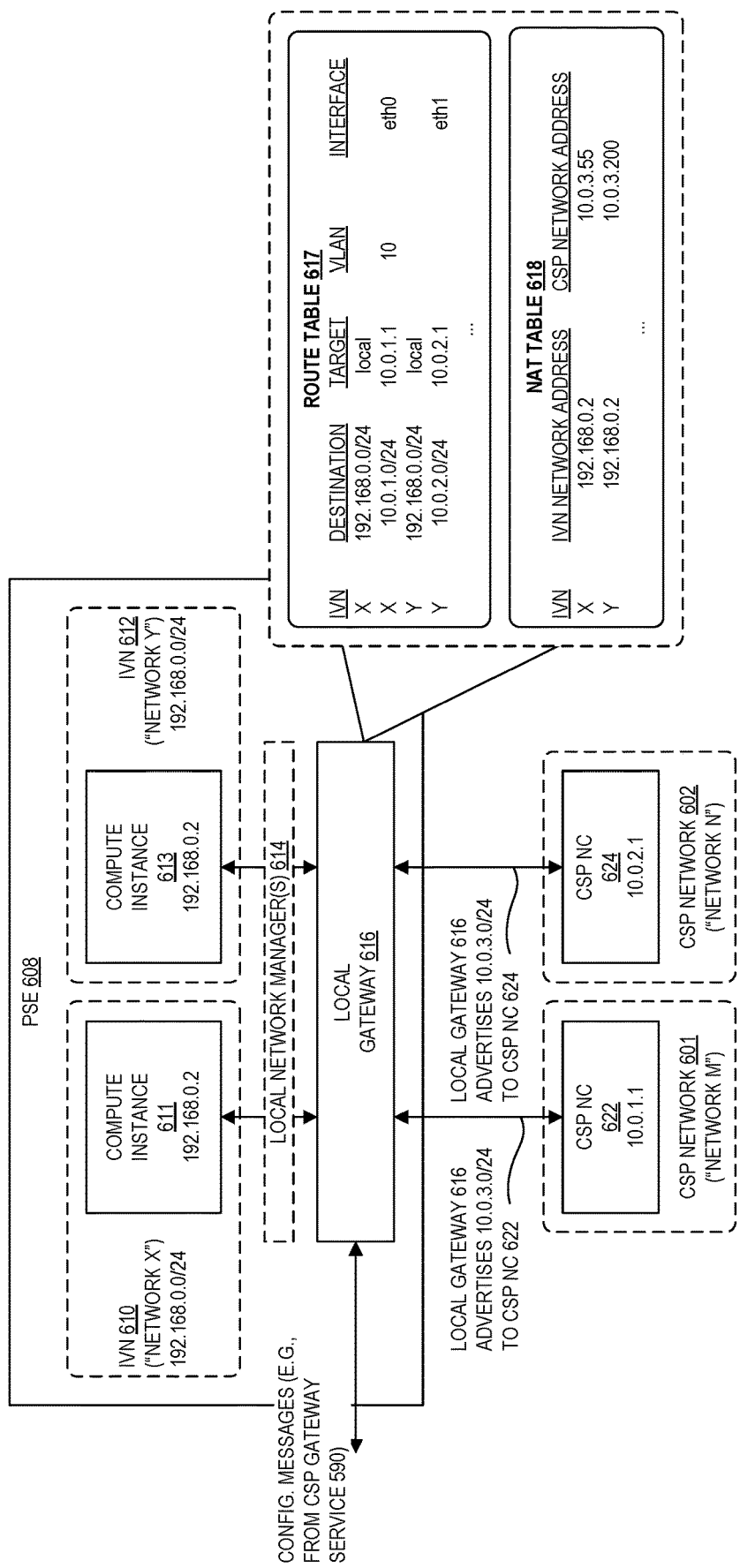
FIG. 6 is a diagram illustrating another implementation for connectivity between compute instances and communications service provider networks according to some embodiments.

FIG. 6 is a diagram illustrating another implementation for connectivity between compute instances and communications service provider networks according to some embodiments. In this example, a PSE 608 includes a local gateway 616 (e.g., the local gateway 146, the local gateway 316) that provides connectivity between instances connected to customer IVNs and CSP networks. Here, the local gateway 616 connects a compute instance 611 in IVN 610 ("Network X") to a CSP network 601 ("Network M") and a compute instance 613 in IVN 612 to a CSP network 602 ("Network M"). The CSP networks 601 and 602 may be different slices or networks of a single CSP (e.g., a 4G network, a fixed line network, a 5G network, etc.) or networks of different CSPs.

In some embodiments, the local gateway 616 has an IP address on the substrate of the cloud provider network (though resident as hardware, software, or some combination thereof within the PSE 608). The compute instances 611 and 613 are hosted by servers of the PSE 608, the servers also having IP addresses on the substrate of the provider network. A local network manager or managers 614 can provide routing for IVNs. For example, the local network manager 614 can receive a packet sent from the compute instance 611 destined for another compute instance of the IVN 610 (not shown), lookup the substrate IP address of the server hosting the other compute instance, and encapsulate the packet in another packet addressed to the server hosting the other compute instance (for another local network manager to decapsulate and pass on to the other instance). As another example, the local network manager 614 may receive a packet destined for an IP address of a logical CSP gateway of an IVN and route that packet to the local gateway along with an indication of the IVN.

For this example, assume a customer has requested connectivity between the compute instance 611 and CSP network 601 and the same or another customer has requested connectivity between the compute instance 613 and CSP network 602. Additionally, the CSP has allocated the 10.0.3.0/24 addresses to the PSE 608, which the local gateway 616 advertises to the network components of the CSP networks (e.g., to CSP NC 622 of CSP network 601 and to CSP NC 624 of CSP network 602). The customers have requested IP addresses from this pool, and the IP address 10.0.3.55 has been assigned to compute instance 611, and the IP address 10.0.3.200 has been assigned to compute instance 613.

To provide such connectivity, the CSP gateway service (not shown) configures the local gateway. For example, the CSP gateway service can associate the compute instances with their assigned IP addresses from the pool of network addresses allocated by the CSP by updating a NAT table 618. As shown, the NAT table 618 associates the compute instance 611 with the CSP network address 10.0.3.55 and the compute instance 613 with the CSP network address 10.0.3.200. Additionally, the CSP gateway service configures the routing to permit the compute instance 611 to communicate with devices (not shown) connected to the CSP network 601 and the compute instance 613 to communicate with devices (not shown) connected to the CSP network 602.

Because the particular connectivity details for various CSP networks may vary from CSP network to CSP network, the configuration data (e.g., stored in a database of database service 592) can include the configuration details for the various CSP networks. Such configuration details can include whether the CSP network uses virtual local area network ("vlan") tagging and which vlans correspond to which networks, the gateway of a given CSP network through which the PSE connects, whether the CSP networks are connected through different physical interfaces of the PSE, etc. In this example, the configuration data for CSP network 601 indicates it includes CSP network addresses 10.0.1.0/24 accessible via a gateway at address 10.0.1.1 on vlan=10 via interface=eth0. Additionally, the configuration data for CSP network 602 indicates it includes CSP network addresses 10.0.2.0/24 accessible via a gateway at address 10.0.2.1 without vlan tagging via interface=eth1. To facilitate routing, the CSP gateway service can configure a route table 617 as indicated. Note that an entry for the source IVN is included to distinguish routes between different IVNs and CSP networks. Here, the route table 617 permits devices on IVN 610 or network "X" to communicate with CSP network 601 but not with CSP network 602. The route table 617 also permits devices on IVN 612 or network "Y" to communicate with CSP network 602 but not with CSP network 601. The route table 617 further includes local route entries to indicate packets addressed to destinations within the range of a given IVN are routed within the IVN.

As indicated herein, one benefit provided by the utilization of PSEs with backing cloud provider networks is that computing resources implemented within PSEs are "closer"

to end users, and thus such architectures provide extremely low-latency interactions preferred by modern computing applications, such as video gaming, communications, etc. Thus, systems employing PSEs can satisfy customer use cases requiring low client latency and can allow users to launch compute instances (and other computing resources) around geographic areas to guarantee reliably low latencies for all clients in the coverage area.

However, many applications need to provide low latency access to end users who obtain network connectivity from different communications service providers—e.g., a first mobile/cellular network operator and a second mobile/cellular network operator. This creates a challenge of deploying a PSE within a network of first CSP to provide its users low latency access to the PSE resources while also allowing other users of other CSPs to similarly obtain low latency access to these PSE resources, which potentially may be located within proprietary networks not typically accessible to entities outside of the first CSP (or its customers).

Figure 7:
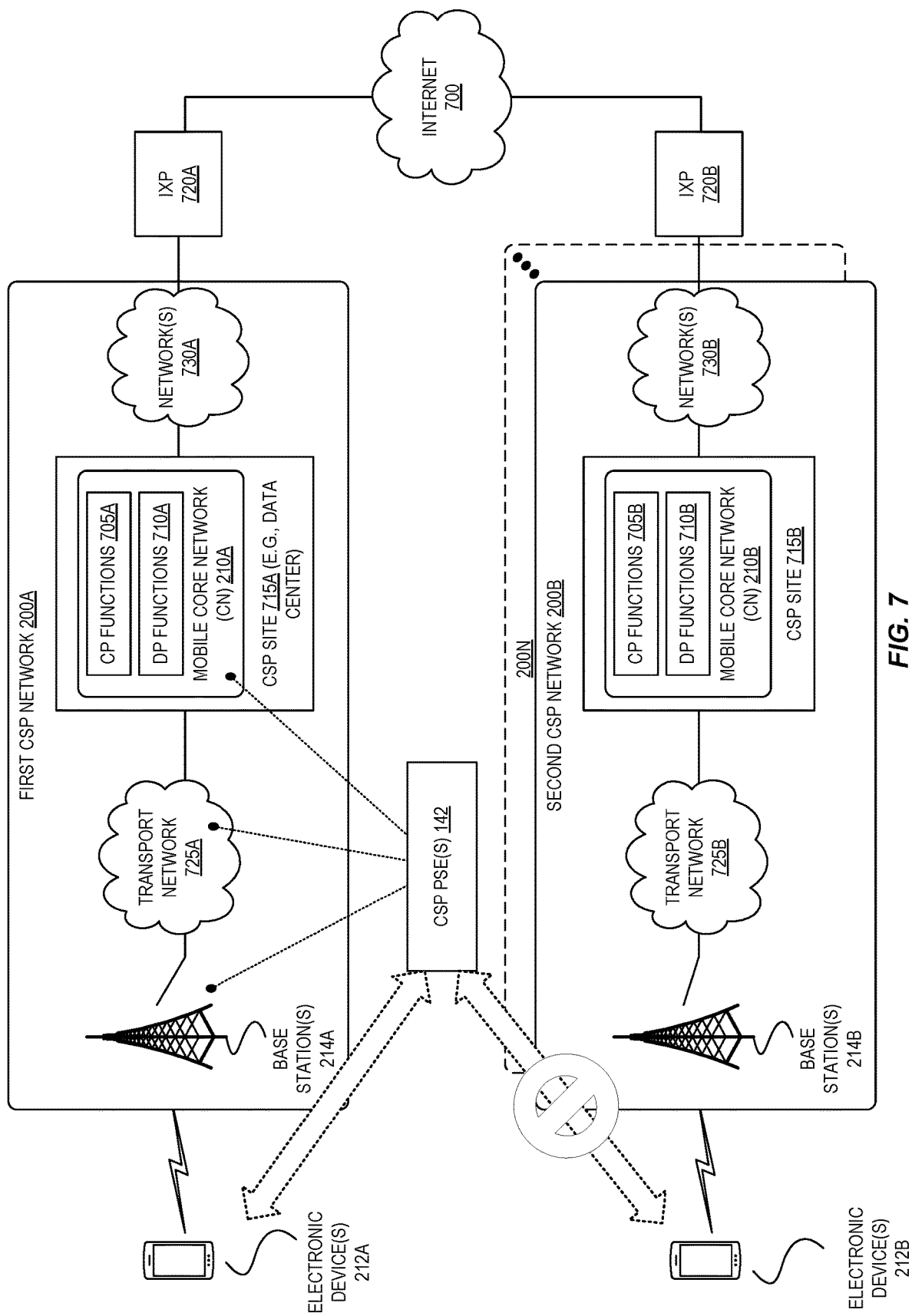
FIG. 7 illustrates exemplary communications service provider networks and a provider substrate extension to be deployed in a communications service provider network according to some embodiments.

Accordingly, embodiments disclosed herein provide techniques for implementing multi-carrier access to a provider substrate extension deployed within a communication service provider network. FIG. 7 illustrates exemplary communications service provider networks and a provider substrate extension to be deployed in a communications service provider network according to some embodiments. Modern communications service provider (or "carrier") networks, or mobile networks, generally have radio towers or base stations 214 at one end of their network 200 that communicate with electronic devices 212 using wireless communication techniques. At or near the base stations 214, traffic originated by the electronic devices 212 goes through one or more transport networks 725/aggregation networks (e.g., via fiber-optic lines) to a CSP site 715 (e.g., a full or mini data center or similar) of the communications provider via an overlay network that may carry traffic, for example, using GPRS Tunneling Protocol (GTP) tunnels. This overlay network (and tunnels) typically terminate at a mobile core network 210, which includes control plane functions 705 and data plane functions 710 for providing communications services. This mobile overlay network may be thought of as a closed network that is proprietary to the communications service provider—only carrier-authorized users/entities can send traffic on this part of its network.

The specific data plane functions 710 and control plane functions 705 implemented in various embodiments may differ based on what generation or type of communications service is being provided. For example, in some 4G Long Term Evaluation (LTE) networks control plane functions 705 and data plane functions 710 may be implemented by well-known entities such as a Mobile Management Entity (MME), Serving Gateway (SGW), Public Data Network Gateway (PDN-GW or PGW), Home Subscriber Server (HSS), and many other entities known to those of skill in the art, though in other types of networks other entities may be implemented that may perform control and/or data plane functions. In some embodiments, these entities may perform only control plane operations or data plane operations, but in many embodiments ones of these entities may perform some control plane operations and some data plane operations.

Generally speaking, data plane functions 710 include operations associated with delivering packets between the user devices and other networks (e.g., the Internet) or between devices, which may include US IP address allocation, packet filtering and forwarding, etc., while the control plane functions 705 may include operations for facilitating data delivery, such as radio resource allocation, mobility management, session management, paging control, billing, security management, configuration management, connection management, broadcast, measurement configuration, measurement reporting, cell selection and/or reselection, etc.

Upon exiting this mobile core network 210, traffic can be sent via one or more networks to an Internet Exchange Point (IXP), where it can be routed as IP traffic via the internet 700 (e.g., using other infrastructure of other providers, using globally-routable network addresses). An IXP (or "IX") is the physical infrastructure through which communications service providers (e.g., cellular providers, or other wired or wireless Internet service providers (ISPs) and content delivery networks (CDNs)) exchange traffic between their networks/autonomous systems.

As disclosed herein, it is beneficial to deploy PSEs as close to the "edge" of these CSP networks 200A-200N as possible—i.e., close to the end-user electronic devices 212A-212B—so these devices can access the resources within the PSE 142 as fast as possible. However, by deploying a CSP PSE 142 within most locations of a carrier network (e.g., first CSP network 200A), this PSE 142 is typically only reachable by electronic devices of that carrier or by other carrier entities, as again, most portions of these networks are closed networks. In such a naïve deployment of a PSE 142, if an application (such as a gaming server) is deployed to the PSE 142 within a first telecommunication service provider's network 200A, users (e.g., electronic devices 221B) of other telecommunication service providers networks 200B-200N likely would not be able to access the application as it is within the first telecommunication service provider's closed-off network.

This leads to a problem in that many applications need to support users that gain network connectivity from a variety of sources—e.g., via wireless cellular service of that telecommunication service provider, via wireless cellular service of other telecommunication service providers, via wired access of another ISP across the Internet, etc. Accordingly, to serve a broad community of users, application owners would necessarily need to deploy these types of applications back at more generally accessible locations, such as within a cloud provider network or other data center. However, although this solves the heterogeneous connectivity issue, it again results in poor user-to-application latency.

Thus, it is desirable to deploy a computing environment such as a PSE within a first carrier network to provide low latency access to these resources from multiple connectivity options, such as through other wireless or wired communications services.

Figure 8:
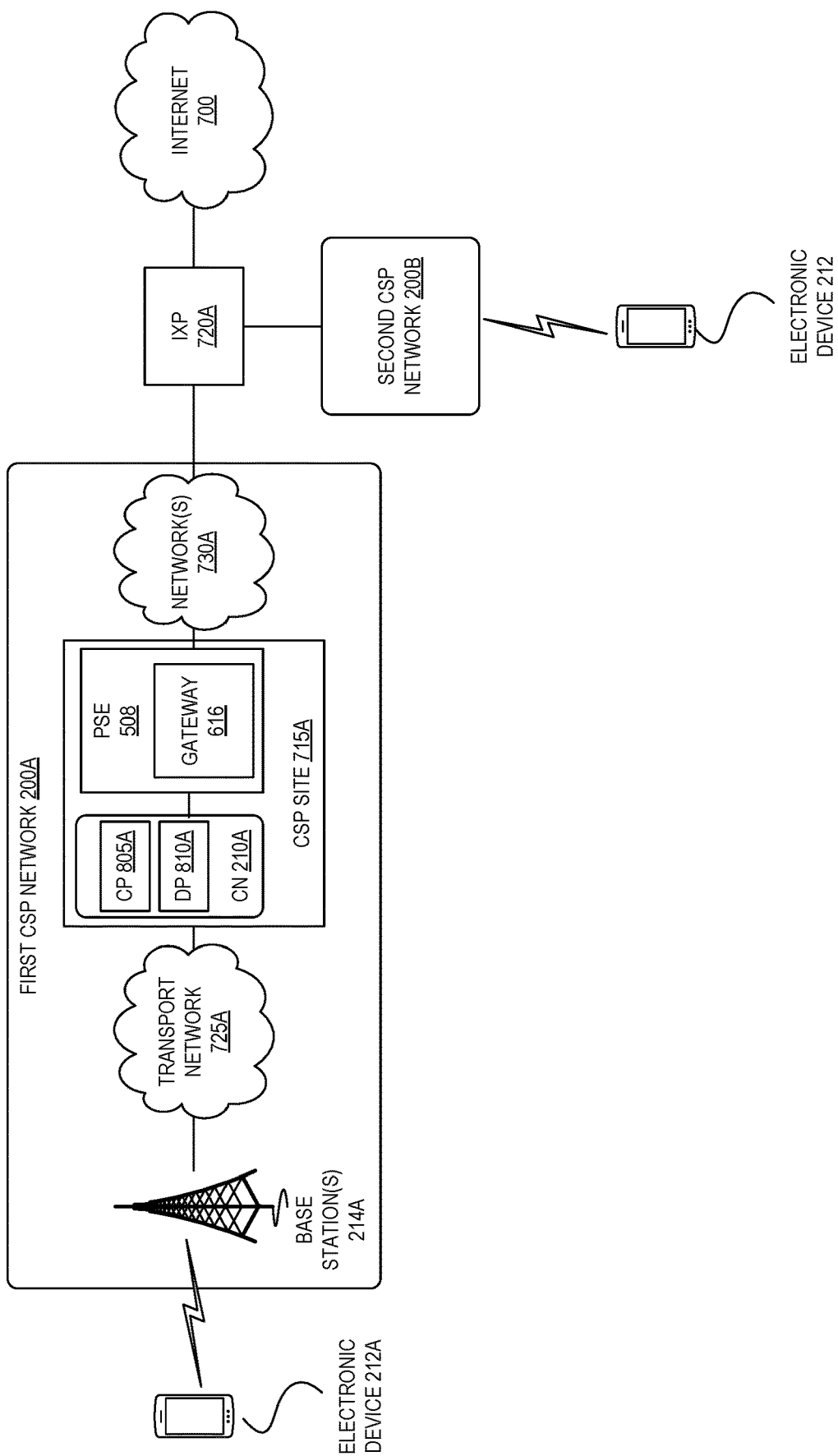
FIG. 8 illustrates an exemplary deployment of a provider substrate extension within a communications service provider network according to some embodiments.

FIG. 8 illustrates an exemplary deployment of a provider substrate extension within a communications service provider network according to some embodiments. In FIG. 8, a PSE 508 is deployed within a telecommunications service provider network 200A data center 800 that implements the mobile core network 210 control plane functions 805 and data plane functions 810. However, in this example, the PSE 508 is deployed "after" the mobile core network 210 (from the vantage point of the user electronic devices 212A) at the "internet-facing" side of the core but before the IXP 720, which allows for the second CSP network 200B to be able to straightforwardly access the PSE 508 resources (assuming proper route advertisements, e.g., made on the part of the gateway 616 and similarly-situated edge routers of the CSP network 200A and/or CSP network 200B).

As described with regard to FIG. 6, the PSE 608 may utilize a gateway 616 configured to permit resources within the PSE 608 to connect to different networks, e.g., CSP network 200A and CSP network 200B, such as via use of an assigned IP space that can be split between these networks, use of different VLANs, etc. In some embodiments, the PSE 508 at its edge (e.g., in a Top of Rack (ToR) switch) may implement a peering session (e.g., via Border Gateway Protocol (BGP) or a similar edge routing protocol) with components of the first CSP network 200A and the second CSP network 200B, e.g., using autonomous system interconnectivity techniques that allow different systems to talk to each other. As a result, this placement setting provides substantial end user latency gains (especially for wireless mobile network clients) compared to more traditional placement environments for applications, e.g., within a typical data center or cloud environment, and without significant changes required to the CSP network 200A.

Figure 9:
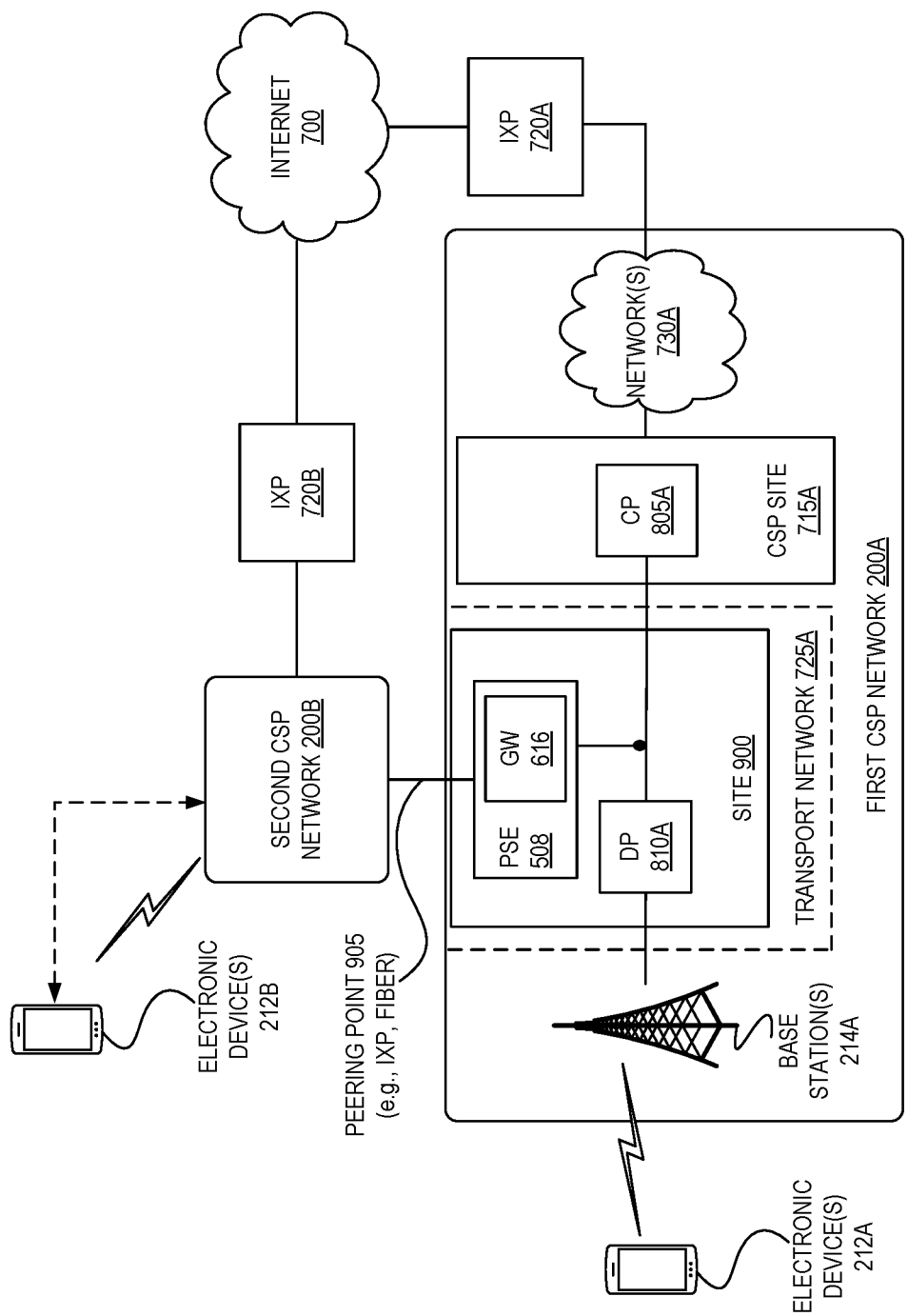
FIG. 9 illustrates an exemplary deployment of a provider substrate extension along with data plane functions within a transport network of a communications service provider network according to some embodiments.

Another example deployment possibility is shown in FIG. 9, which illustrates an exemplary deployment of a provider substrate extension along with data plane functions within a transport network of a communications service provider network according to some embodiments.

In some embodiments, the PSE 508 can be placed even closer to the edge by effectively splitting the control plane functions 805 and the data plane functions 810 into two. As illustrated, the data plane functions 810 (e.g., Service Architecture Evolution Gateway (SAE-GW) functions) may be moved to sit closer to the edge at a site 900 that may be within a transport network 725A, and a breakout from this site can be made to connect to a PSE 508. The site 900 could be, e.g., a network aggregation site only a few "hops" from the base station(s) 214. As the data plane functions 810 may terminate the overlay network, the user-plane traffic effectively exits the mobile overlay network, and thus the traffic is turned into IP traffic and can be straightforwardly sent to the PSE 508, again using the gateway 616 techniques involving multiple carrier networks and address spaces disclosed herein, or sent on to the rest of the core (e.g., via a backhaul). In some embodiments, the control plane functions 805 can be placed further away from this site 900, e.g., back in the core network implemented in a CSP site 715A (e.g., a data center), and still have the control signaling work well. The PSE 508, in this environment, may be peered with the second CSP network 200B at a peering point 905 that may be, e.g., at the site 900 or a nearby site. The peering point 905 may be, for example, a connection between the second CSP network 200B and the PSE 508 made via a physical network connection (e.g., fiberoptic line, or similar network communications cabling) or wireless network connection, and may be at an IXP point between the two CSP networks 200A-200B.

Figure 10:
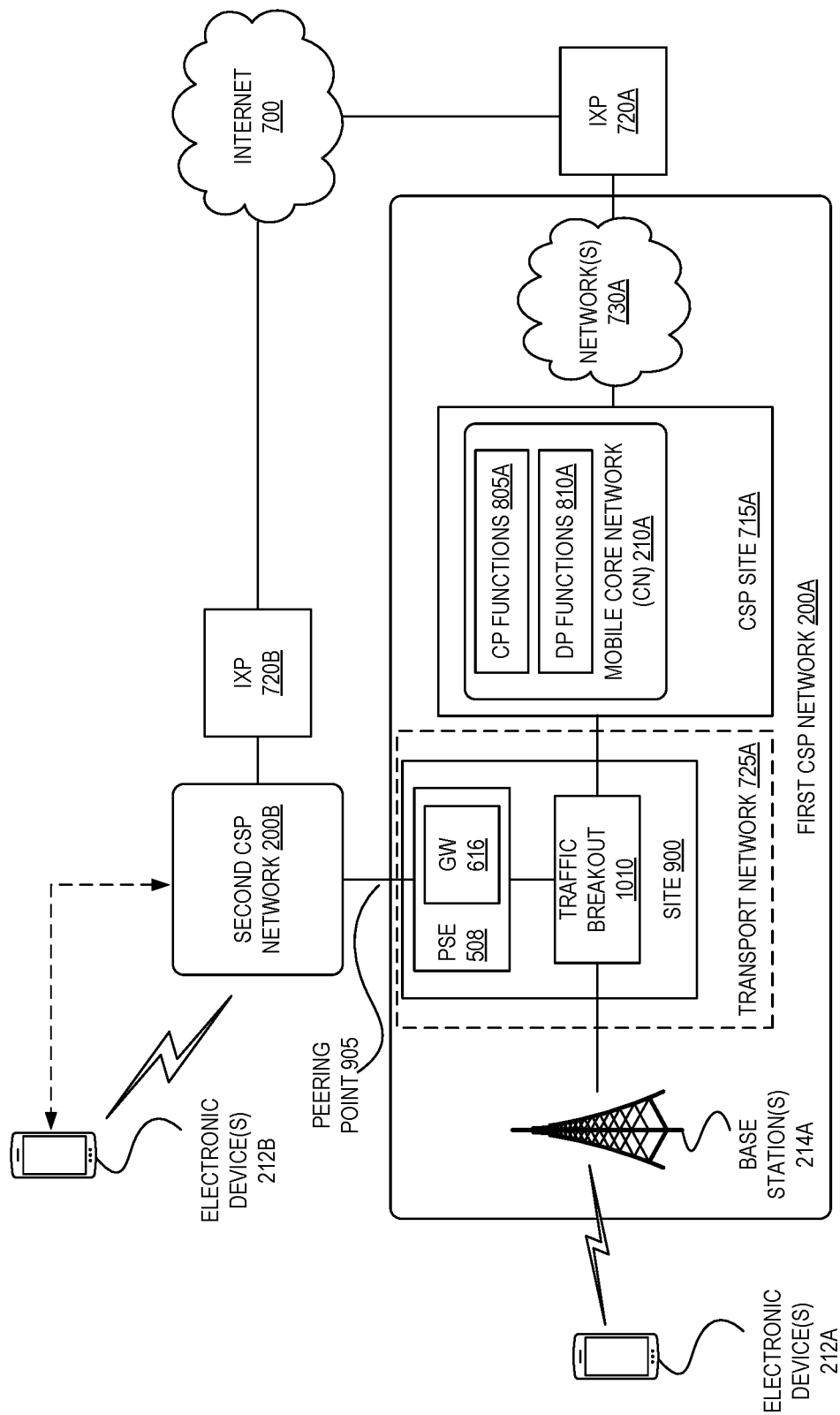
FIG. 10 illustrates an exemplary deployment of a provider substrate extension along with a traffic breakout system within a transport network of a communications service provider network according to some embodiments.

FIG. 10 illustrates another exemplary deployment of a provider substrate extension along with a traffic breakout system within a transport network of a communications service provider network according to some embodiments. This architecture utilizes a traffic breakout steering system (traffic breakout 1010), which may be implemented in software, hardware, or both, that can monitor traffic passing through it and separate out the traffic that is meant for the applications of the PSE 508, which is steered away from going to the mobile core and instead forwarded to the PSE 508. Other traffic, e.g., voice calls, general Internet traffic, etc., may be passed through to the core without modification.

In some embodiments, the traffic breakout 1010 may be deployed as a transparent proxy that can identify, based on traffic flow identifiers (e.g., combinations of packet headers, such as the protocol (e.g., TCP) value, the source and destination port numbers, and/or the source and destination IP addresses), based on an Access Point Name (APN) configured for the user device when attempting to reach the PSE, etc. This information can be programmed or otherwise provided to the traffic breakout 1010, e.g., by the control plane functions 805A of the CSP network 200A. Beneficially, this architecture similarly places the PSE 508 very close to the end users electronic devices 212A, resulting in very low latencies, and involves introducing a traffic breakout 1010 instead of moving DP functions (as in FIG. 9) away from their typical deployment location in a data center, which may be more preferred or less preferred by the CSP.

Figure 11:
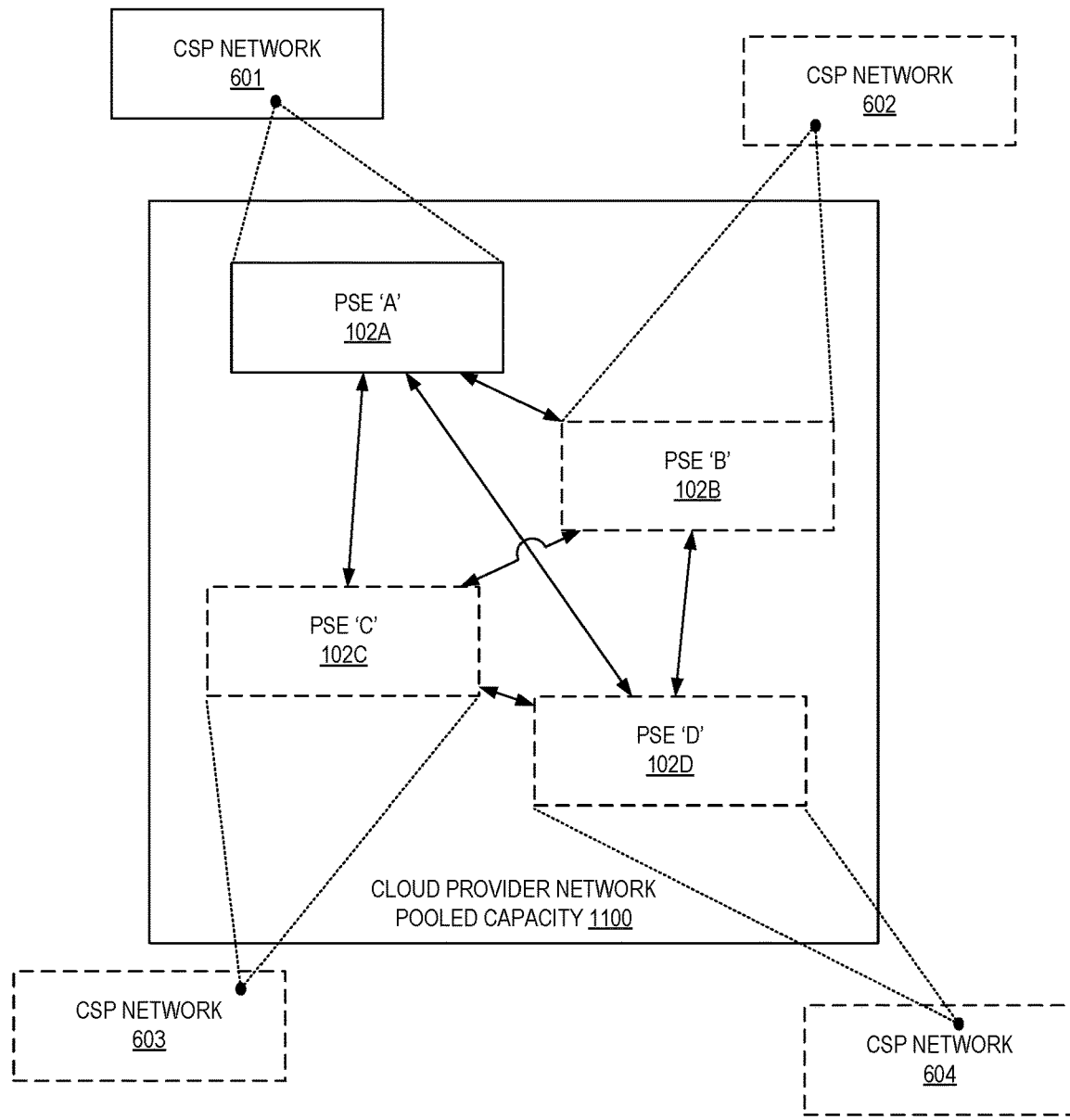
FIG. 11 illustrates pooled capacity provided by the deployment of provider substrate extensions within communications service provider networks according to some embodiments.

FIG. 11 illustrates pooled capacity provided by the deployment of provider substrate extensions within communications service provider networks according to some embodiments. As a result of implementing a number of PSEs 102A-120D within potentially multiple CSP networks 601-604, the cloud provider network 100 is thus provided with a large pool of distributed capacity 1100 in which to place computing resources for its customers, where the resources are extremely close from a latency perspective to users of the CSP network(s) 601-604, and where the resources may be accessed by end users coming from a wide number of different networks and types of networks.

Figure 12:
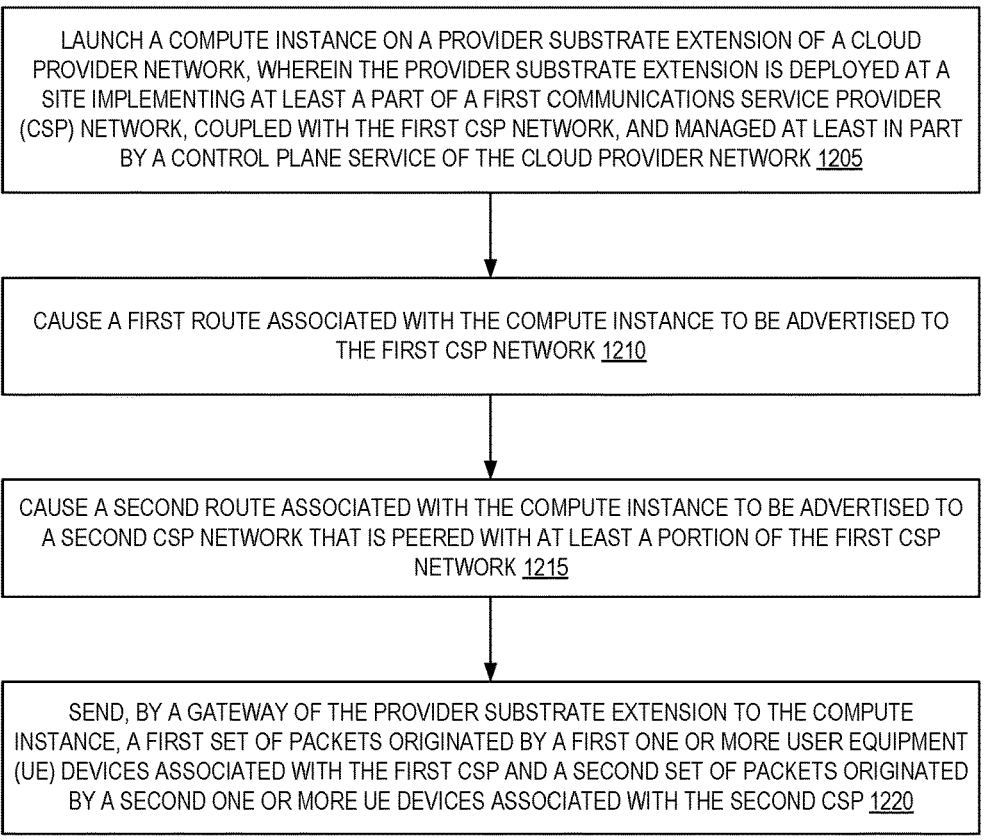
FIG. 12 is a flow diagram illustrating operations of a method for providing multi-carrier access to a provider substrate extension according to some embodiments.

FIG. 12 is a flow diagram illustrating operations of a method for providing multi-carrier access to a provider substrate extension deployed within a communication service provider network according to some embodiments. Some or all of the operations 1200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more of the operations 1200 are performed by a CSP network (e.g., first CSP network 200A) of the other figures.

The operations 1200 include, at block 1205, launching a compute instance on a provider substrate extension of a cloud provider network, wherein the provider substrate extension is deployed at a site implementing at least a part of a first CSP network, coupled with the first CSP network, and managed at least in part by a control plane service of the cloud provider network.

In some embodiments, the provider substrate extension may not be deployed at a site implementing at least a part of a CSP network, however, and could be a cloud provider network-managed PSE 140, a customer-managed PSE 144, etc.

In some embodiments, the provider substrate extension is implemented between one or more mobile core network functions of the first CSP network and an internet exchange point where an edge of the second CSP network exists. The site may comprise a data center of the CSP, and in some embodiments, the data center further implements the one or more mobile core network functions of the first CSP network.

At block 1210, the operations 1200 include causing a first route associated with the compute instance to be advertised to the first CSP network, e.g., via a peering session between a gateway/switch of the provider substrate extension and a network entity of the first CSP using an edge routing protocol (e.g., BGP), and at block 1215, causing a second route associated with the compute instance to be advertised to a second CSP network that is peered with at least a portion of the first CSP network, e.g., via a peering session between a gateway/switch of the provider substrate extension (or of the first CSP) and a network entity of the second CSP using an edge routing protocol (e.g., BGP). Blocks 1210, 1215 may be performed by a gateway of the provider substrate extension, e.g., by advertising routes with another network component, or may be performed by a cloud provider network (or another entity) in configuring the gateway to advertise these routes.

At block 1220, the operations 1200 include sending, by a gateway of the provider substrate extension to the compute instance, a first set of packets originated by a first one or more user equipment (UE) devices associated with the first CSP and a second set of packets originated by a second one or more UE devices associated with the second CSP. In some embodiments, the first set of packets and the second set of packets did not transit the public internet. For example, in some embodiments the PSE is directly connected to the first CSP network and to the second CSP network, and network traffic transiting between the PSE and the first or second CSP network may be sent entirely within these networks, respectively.

In some embodiments, the provider substrate extension is implemented within a transport network of the first CSP network, wherein the transport network is between one or more base stations and a data center hosting one or more control plane mobile core network functions. One or more data plane mobile core network functions may be implemented within the transport network, and the one or more data plane mobile core network functions terminate one or more tunnels with the one or more base stations via decapsulating network traffic originated by the first one or more UE devices sent via the one or more tunnels into the first set of packets to be sent to the gateway of the PSE. In some embodiments, the data center further hosts one or more data plane mobile core network functions, and in some embodiments, the transport network further includes a traffic breakout system, where the traffic breakout system monitors encapsulated network traffic sent via one or more tunnels between the one or more base stations and the one or more data plane mobile core network functions, identifies parts of the encapsulated network traffic that are destined to the PSE, and causes those identified parts of encapsulated network traffic to be steered toward the PSE. To identify the parts of the encapsulated network traffic that are destined to the PSE, in some embodiments the traffic breakout system identifies traffic having a known flow identifier (e.g., a combination of one or more values of one or more headers, such as a combination of a protocol value, source and destination port, and source and destination IP address) or access point name (APN).

In some embodiments, the first CSP provides wireless communications services to the first one or more UEs, where the first one or more UEs comprise wireless computing devices that communicate with the first CSP network via one or more base stations.

In some embodiments, the operations 1200 further include causing a third route associated with the compute instance to be advertised to a third CSP network that is peered with at least a portion of the first CSP network; and sending, by the gateway of the provider substrate extension, a third set of packets originated by a third one or more UE devices associated with the third CSP to the compute instance.

Figure 13:
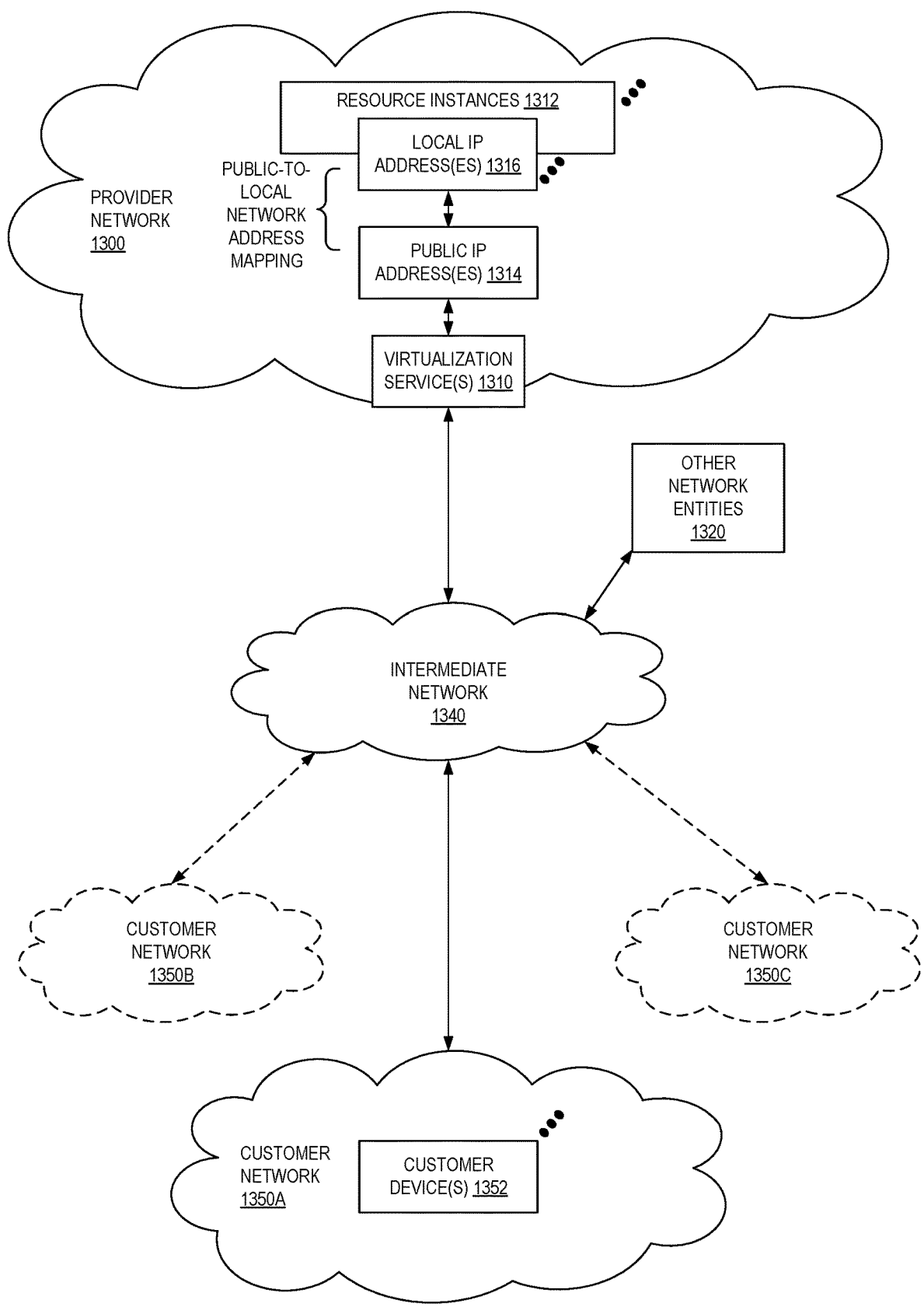
FIG. 13 illustrates an example provider network environment according to some embodiments.

FIG. 13 illustrates an example provider network (or "service provider system") environment according to some embodiments. A provider network 1300 may provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 may be associated with the resource instances 1312; the local IP addresses are the internal network addresses of the resource instances 1312 on the provider network 1300. In some embodiments, the provider network 1300 may also provide public IP addresses 1314 and/or public IP address ranges (e.g., Internet Protocol version 4 (IPv4) or Internet Protocol version 6 (IPv6) addresses) that customers may obtain from the provider 1300.

Conventionally, the provider network 1300, via the virtualization services 1310, may allow a customer of the service provider (e.g., a customer that operates one or more client networks 1350A-1350C including one or more customer device(s) 1352) to dynamically associate at least some public IP addresses 1314 assigned or allocated to the customer with particular resource instances 1312 assigned to the customer. The provider network 1300 may also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of customer network(s) 1350A-1350C may, for example, implement customer-specific applications and present the customer's applications on an intermediate network 1340, such as the Internet. Other network entities 1320 on the intermediate network 1340 may then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 may be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1300; a customer may then assign their allocated public IP addresses to particular resource instances allocated to the customer. These public IP addresses may be referred to as customer public IP addresses, or simply customer IP addresses. Instead of being assigned by the provider network 1300 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
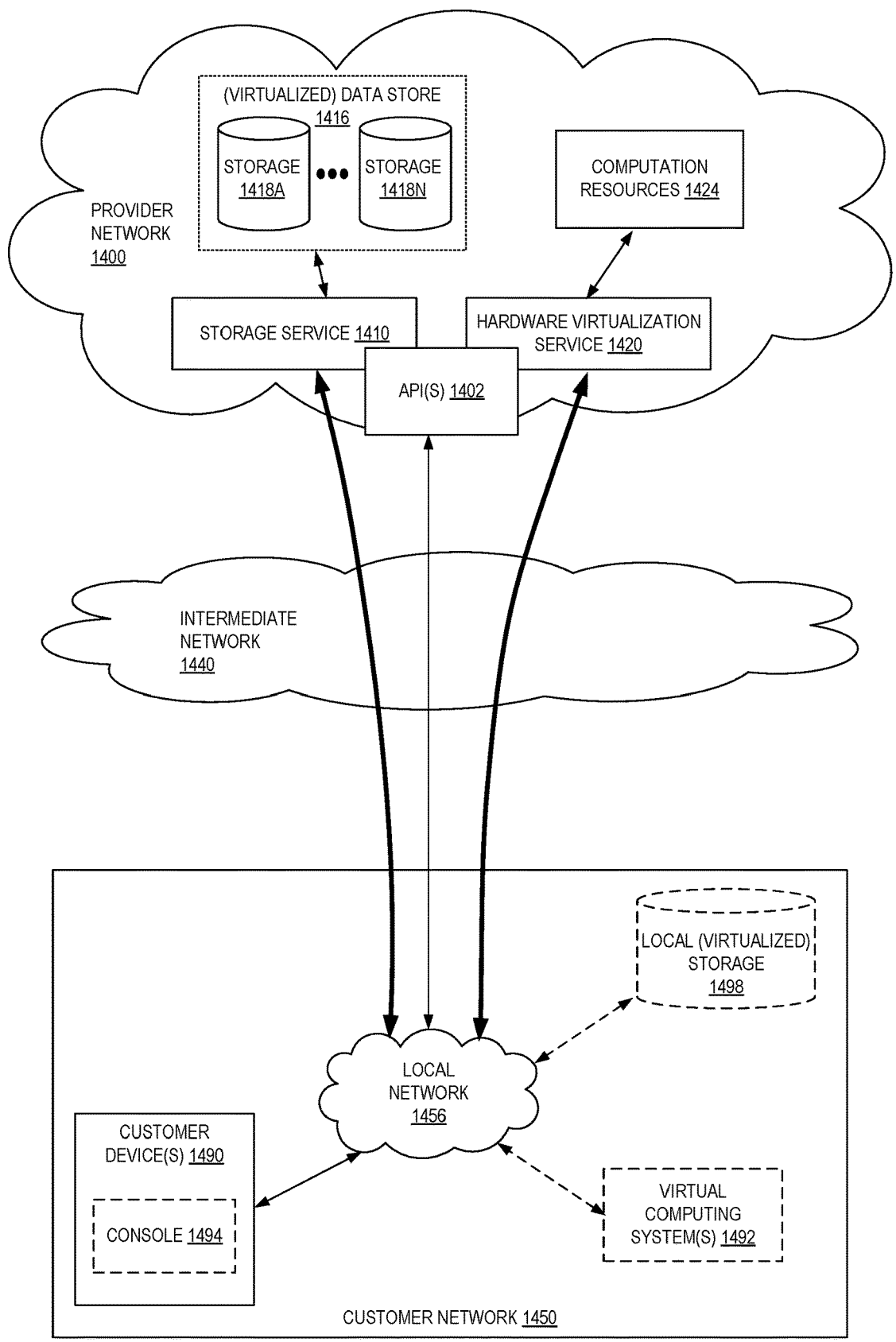
FIG. 14 is a block diagram of an example provider network that provides a storage service and a hardware virtualization service to customers according to some embodiments.

FIG. 14 is a block diagram of an example provider network that provides a storage service and a hardware virtualization service to customers, according to some embodiments. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some embodiments, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage service 1410, for example via one or more APIs 1402, to access data from and store data to storage resources 1418A-1418N of a virtual data store 1416 (e.g., a folder or "bucket", a virtualized volume, a database, etc.) provided by the provider network 1400. In some embodiments, a virtualized data store gateway (not shown) may be provided at the customer network 1450 that may locally cache at least some data, for example frequently-accessed or critical data, and that may communicate with storage service 1410 via one or more communications channels to upload new or modified data from a local cache so that the primary store of data (virtualized data store 1416) is maintained. In some embodiments, a user, via a virtual computing system 1492 and/or on another customer device 1490, may mount and access virtual data store 1416 volumes via storage service 1410 acting as a storage virtualization service, and these volumes may appear to the user as local (virtualized) storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Illustrative Systems

Figure 15:
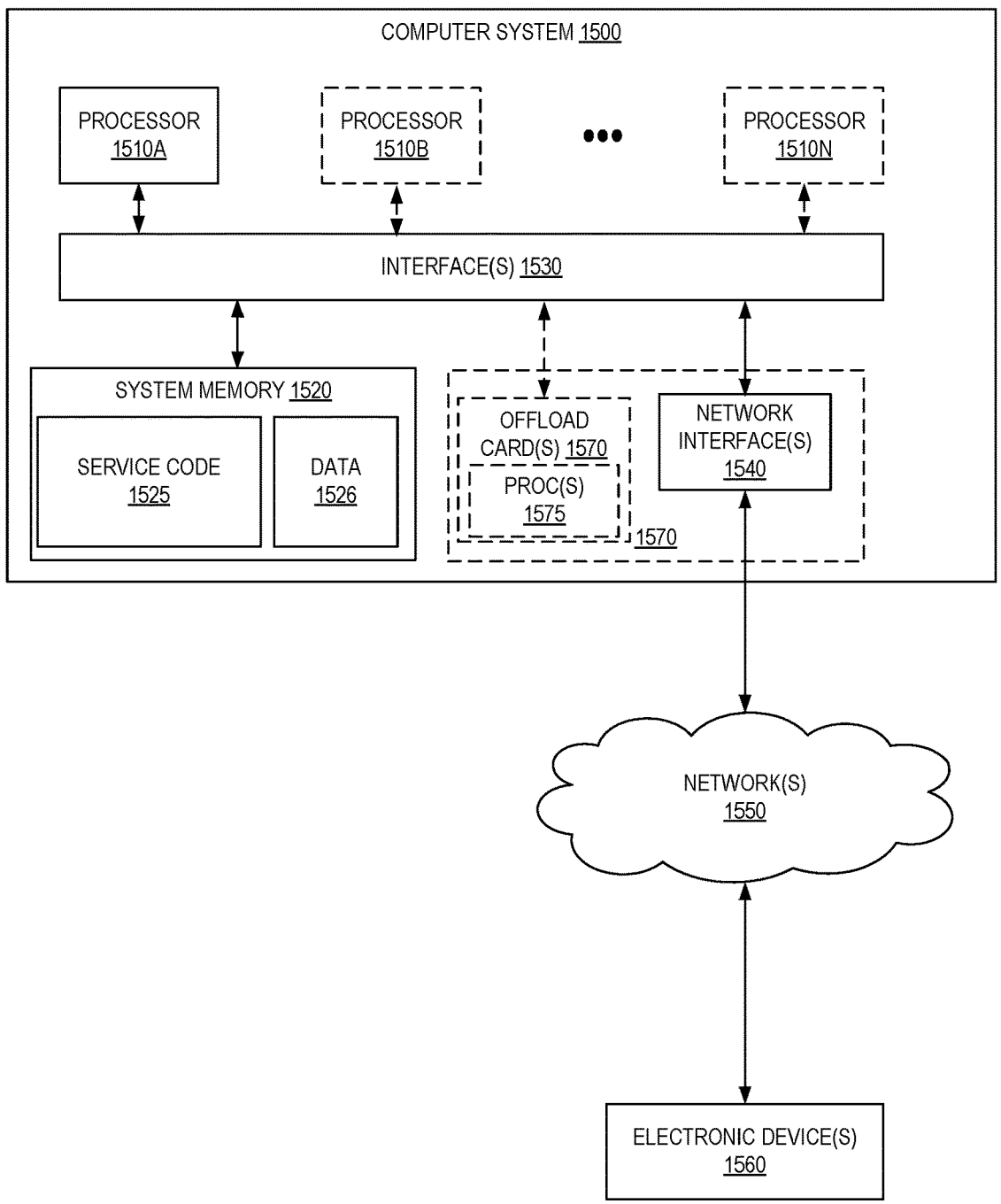
FIG. 15 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1500 illustrated in FIG. 15. In the illustrated embodiment, computer system 1500 includes one or more processors 1510 coupled to a system memory 1520 via an input/output (I/O) interface 1530. Computer system 1500 further includes a network interface 1540 coupled to I/O interface 1530. While FIG. 15 shows computer system 1500 as a single computing device, in various embodiments a computer system 1500 may include one computing device or any number of computing devices configured to work together as a single computer system 1500.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1510 may commonly, but not necessarily, implement the same ISA.

System memory 1520 may store instructions and data accessible by processor(s) 1510. In various embodiments, system memory 1520 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1520 as service code 1525 and data 1526.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIG. 1, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1500 includes one or more offload cards 1570 (including one or more processors 1575, and possibly including the one or more network interfaces 1540) that are connected using an I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1500 may act as a host electronic device (e.g., operating as part of a hardware virtualization service) that hosts compute instances, and the one or more offload cards 1570 execute a virtualization manager that can manage compute instances that execute on the host electronic device. As an example, in some embodiments the offload card(s) 1570 can perform compute instance management operations such as pausing and/or un-pausing compute instances, launching and/or terminating compute instances, performing memory transfer/copying operations, etc. These management operations may, in some embodiments, be performed by the offload card(s) 1570 in coordination with a hypervisor (e.g., upon a request from a hypervisor) that is executed by the other processors 1510A-1510N of the computer system 1500. However, in some embodiments the virtualization manager implemented by the offload card(s) 1570 can accommodate requests from other entities (e.g., from compute instances themselves), and may not coordinate with (or service) any separate hypervisor.

In some embodiments, system memory 1520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1418A-1418N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
launching a compute instance on a provider substrate extension of a cloud provider network, wherein the provider substrate extension is deployed within a site of a first communications service provider (CSP) network of a first CSP, the site including computing resources implementing at least a portion of a mobile core network comprising one or more control plane functions and one or data plane functions of the first CSP network, wherein the provider substrate extension is communicatively coupled between the mobile core network and an internet exchange point (IXP), and wherein the provider substrate extension is managed at least in part by a control plane service of the cloud provider network;
causing a first route associated with the compute instance to be advertised to the first CSP network;
causing a second route associated with the compute instance to be advertised to a second CSP network of a second CSP that is peered with at least a portion of the first CSP network; and
receiving, by a gateway of the provider substrate extension, a first set of packets originated by a first one or more user equipment (UE) devices, wherein the first set of packets were sent through one or more transport networks via a tunnel of a mobile overlay network of the first CSP network, exited the tunnel at the mobile core network, and were routed to the provider substrate extension via the first CSP network;

receiving, by the gateway of the provider substrate extension, a second set of packets originated by a second one or more UE devices and routed to the provider substrate extension via the second CSP network through the IXP; and forwarding, by the gateway to the compute instance, the first set of packets and the second set of packets.

2. The computer-implemented method of claim 1, wherein:
the first CSP provides wireless communications services to the first one or more UE devices;
each of the first one or more UE devices comprises a wireless computing device that communicates with the first CSP network via a first one or more base stations;
the second CSP provides wireless communications services to the second one or more UE devices; and
the second one or more UE devices comprise wireless computing devices that communicate with the second CSP network via a second one or more base stations.

3. The computer-implemented method of claim 2, wherein the first set of packets and the second set of packets did not transit the public internet.

4. A computer-implemented method comprising:
launching a compute instance on a provider substrate extension of a cloud provider network, wherein the provider substrate extension is deployed at a site implementing at least a part of a first communications service provider (CSP) network of a first CSP, is coupled with the first CSP network, and is managed at least in part by a control plane service of the cloud provider network, wherein the provider substrate extension is communicatively coupled between one or more mobile core network functions of the first CSP network and an internet exchange point (IXP) where an edge of a second CSP network of a second CSP exists;
causing a first route associated with the compute instance to be advertised to the first CSP network;
causing a second route associated with the compute instance to be advertised to the second CSP network that is peered with at least a portion of the first CSP network; and
sending, by a gateway of the provider substrate extension to the compute instance, a first set of packets originated by a first one or more user equipment (UE) devices associated with the first CSP and a second set of packets originated by a second one or more UE devices associated with the second CSP and routed to the provider substrate extension via the second CSP network through the IXP.

5. The computer-implemented method of claim 4, wherein the site further implements the one or more mobile core network functions of the first CSP network.

6. The computer-implemented method of claim 4, wherein the provider substrate extension is implemented within a transport network of the first CSP network, wherein the transport network is between one or more base stations and a CSP site of the first CSP hosting one or more mobile core network control plane functions.

7. The computer-implemented method of claim 6, wherein one or more data plane mobile core network functions are implemented within the transport network, and wherein the one or more data plane mobile core network functions terminate one or more tunnels with the one or more base stations via decapsulating network traffic originated by the first one or more UE devices sent via the one or more tunnels into the first set of packets to be sent to the gateway of the provider substrate extension.

8. The computer-implemented method of claim 6, wherein the CSP site further hosts one or more data plane mobile core network functions.

9. The computer-implemented method of claim 8, wherein the transport network further includes a traffic breakout system, wherein the traffic breakout system monitors encapsulated network traffic sent via one or more tunnels between the one or more base stations and the one or more data plane mobile core network functions, identifies parts of the encapsulated network traffic that are destined to the provider substrate extension, and causes those identified parts of encapsulated network traffic to be steered toward the provider substrate extension.

10. The computer-implemented method of claim 9, wherein to identify the parts of the encapsulated network traffic that are destined to the provider substrate extension, the traffic breakout system identifies traffic having a known flow identifier based on one or more packet header values or a known access point name (APN).

11. The computer-implemented method of claim 4, wherein the first CSP provides wireless communications services to the first one or more UE devices, and wherein the first one or more UE devices comprise wireless computing devices that communicate with the first CSP network via one or more base stations.

12. The computer-implemented method of claim 4, further comprising:
causing a third route associated with the compute instance to be advertised to a third CSP network that is peered with at least a portion of the first CSP network; and
sending, by the gateway of the provider substrate extension, a third set of packets originated by a third one or more UE devices associated with the third CSP network to the compute instance.

13. The computer-implemented method of claim 4, wherein the first set of packets and the second set of packets did not transit the public internet.

14. The computer-implemented method of claim 4, wherein:
the compute instance is accessible within the first CSP network via a first network address within an address space of the first CSP network; and
the compute instance is accessible within the second CSP network via a second network within an address space of the second CSP network.

15. The computer-implemented method of claim 4, wherein:
the compute instance is accessible within the first CSP network via a first network address; and
the compute instance is accessible within the second CSP network via the first network address.

16. A system comprising:
a cloud provider network implemented by a first one or more electronic devices, the cloud provider network including instructions which when executed cause the cloud provider network to, upon receipt of a request to launch a compute instance on behalf of a user of the cloud provider network, send one or more messages to a provider substrate extension of the cloud provider network to launch the compute instance; and
the provider substrate extension of the cloud provider network, the provider substrate extension being implemented by a second one or more electronic devices, wherein one or more of the second one or more electronic devices provide capacity for execution of compute instances, and wherein the provider substrate extension is controlled at least in part by a control plane of the cloud provider network, the provider substrate extension including instructions which when executed cause the provider substrate extension to:

launch the compute instance in the provider substrate extension, wherein the provider substrate extension is deployed at a site implementing at least a part of a first communications service provider (CSP) network of a first CSP and is coupled with the first CSP network, and wherein the provider substrate extension is communicatively coupled between one or more mobile core network functions of the first CSP network and an internet exchange point (IXP) where an edge of a second CSP network of a second CSP exists;

cause a first route associated with the compute instance to be advertised to the first CSP network;

cause a second route associated with the compute instance to be advertised to the second CSP network that is peered with at least a portion of the first CSP network; and send, by a gateway of the provider substrate extension to the compute instance, a first set of packets originated by a first one or more user equipment (UE) devices associated with the first CSP and a second set of packets originated by a second one or more UE devices associated with the second CSP and routed to the provider substrate extension via the second CSP network through the IXP.

17. The system of claim 16, wherein:

the provider substrate extension is implemented within a transport network of the first CSP network, wherein the transport network is between one or more base stations and a data center hosting one or more control plane mobile core network functions.

18. The system of claim 17, wherein:

one or more data plane mobile core network functions are implemented within the transport network, and wherein the one or more data plane mobile core network functions terminate one or more tunnels with the one or more base stations via decapsulating network traffic originated by the first one or more UE devices sent via the one or more tunnels into the first set of packets to be sent to the gateway of the provider substrate extension.

* * * * *